United States Patent
Ogiwara et al.

(10) Patent No.: US 10,202,035 B2
(45) Date of Patent: Feb. 12, 2019

(54) FUEL SHUTOFF VALVE

(71) Applicant: HONDA MOTOR CO., LTD., Tokyo (JP)

(72) Inventors: Naoki Ogiwara, Wako (JP); Yusuke Sakaguchi, Wako (JP); Hiroaki Watanabe, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 88 days.

(21) Appl. No.: 15/264,156

(22) Filed: Sep. 13, 2016

(65) Prior Publication Data

US 2017/0072788 A1 Mar. 16, 2017

(30) Foreign Application Priority Data

Sep. 14, 2015 (JP) ................................. 2015-180512

(51) Int. Cl.
*B60K 15/035* (2006.01)
*B60K 15/03* (2006.01)
(Continued)

(52) U.S. Cl.
CPC .. *B60K 15/03519* (2013.01); *B60K 15/03504* (2013.01); *B60K 2015/03256* (2013.01);
(Continued)

(58) Field of Classification Search
CPC ........ B60K 15/03519; B60K 15/03504; B60K 2015/03256; B60K 2015/03302;
(Continued)

(56) References Cited

U.S. PATENT DOCUMENTS 2,863,473 A * 12/1958 Gantz ................. F16K 31/0651
137/599.07
3,100,103 A * 8/1963 Bullard ................. F16K 31/408
251/30.03
(Continued)

FOREIGN PATENT DOCUMENTS

JP 63-121760 U 8/1988
JP 04-36182 U 3/1992
(Continued)

OTHER PUBLICATIONS

Office Action dated Jun. 27, 2017, issued in counterpart Japanese Patent Application No. 2015-180512, with English translation. (6 pages).

*Primary Examiner* — Craig J Price
(74) *Attorney, Agent, or Firm* — Westerman, Hattori, Daniels & Adrian, LLP (57) ABSTRACT

A fuel shutoff valve is attached to the upper portion of a fuel tank and shuts off the communication between the inside of the fuel tank and a canister by opening and closing a vapor passage for communicating between the fuel tank and the canister. The fuel shutoff valve is configured with a first valve mechanism having a coil disposed on the inner periphery of a cylindrical valve chamber and a movable core, which enables to communicate between the fuel tank and the canister by lowering the level of the movable core, and a second valve mechanism which enables to communicate between the fuel tank and the outside thereof by shifting the level of the valve body which is disposed inside the movable core due to the pressure from the inside of the fuel tank or the outside thereof.

12 Claims, 8 Drawing Sheets

(51) Int. Cl.
*F02M 25/08* (2006.01)
*F16K 31/06* (2006.01)

(52) U.S. Cl.
CPC .............. *B60K 2015/03302* (2013.01); *F02M 25/0836* (2013.01); *F02M 2025/0845* (2013.01); *F16K 31/0658* (2013.01); *Y10T 137/7777* (2015.04)

(58) Field of Classification Search
CPC ........... B60K 2015/03526; B60K 2015/03561; B60K 2015/03296; F02M 25/0836; F02M 2025/0845; Y10T 137/7771–137/7777; Y10T 137/778; Y10T 137/88022–137/88062; F16K 31/0658; F16K 31/0655; F16K 24/04; F16K 31/0693; F16K 31/408; F16K 31/0651; F25B 2341/06–2341/0683
USPC ........ 137/493–493.6, 493.9, 614.16–614.21; 251/129.08, 129, 16, 129.15; 123/516–521, 625; 417/416, 417
See application file for complete search history.

(56) References Cited

U.S. PATENT DOCUMENTS

| | | | | |
|---|---|---|---|---|
| 3,173,646 | A * | 3/1965 | Wilcox | F16K 31/0606 251/129.2 |
| 3,324,889 | A * | 6/1967 | Batts | F16K 31/0606 137/625.65 |
| 3,759,293 | A * | 9/1973 | Tanaka | B60T 7/122 137/598 |
| 4,504,198 | A * | 3/1985 | Toyoda | F04B 17/046 417/417 |
| 4,743,179 | A * | 5/1988 | Waas | F04B 17/042 417/417 |
| 5,282,738 | A * | 2/1994 | Oshima | F23K 5/04 417/297 |
| 5,735,582 | A * | 4/1998 | Eith | B60T 8/363 137/596.17 |
| 6,209,970 | B1 * | 4/2001 | Kamiya | B60T 8/363 137/596.17 |
| 6,253,802 | B1 * | 7/2001 | Enge | B60K 15/03519 123/518 |
| 6,273,689 | B1 * | 8/2001 | Kenichi | F04B 17/046 417/417 |
| 6,405,743 | B1 * | 6/2002 | Spryshak | F16K 31/0689 137/1 |
| 6,450,152 | B1 * | 9/2002 | Everingham | F02M 25/0836 123/516 |
| 6,994,308 | B1 * | 2/2006 | Wang | F16K 1/12 251/129.21 |
| 7,094,041 | B2 * | 8/2006 | Hashimoto | F04B 17/046 417/417 |
| 7,316,545 | B2 * | 1/2008 | Lenke | F01N 3/2066 417/274 |
| 7,322,804 | B2 * | 1/2008 | Humburg | F04B 13/00 417/416 |
| 8,944,785 | B2 * | 2/2015 | Lilie | F04B 35/045 417/417 |
| 9,046,189 | B2 * | 6/2015 | Watanabe | F16K 31/408 |
| 9,683,665 | B2 * | 6/2017 | Harada | F16K 1/526 |
| 9,696,732 | B2 * | 7/2017 | Harada | G05D 16/106 |
| 9,840,986 | B2 * | 12/2017 | Onodera | F02M 25/0836 |
| 2005/0217734 | A1 * | 10/2005 | Takakura | F16K 24/04 137/587 |
| 2009/0236350 | A1 * | 9/2009 | Miura | B60K 15/03504 220/745 |

FOREIGN PATENT DOCUMENTS

JP      5709573 B2    4/2015
WO    WO 2016106310 A1 *   6/2016  ........ F16K 31/0651

* cited by examiner

evaporated fuel

Fig. 6(b)

Fig.8 PRIOR ART

FUEL SHUTOFF VALVE

TECHNICAL FIELD

The present disclosure relates to a fuel shutoff valve shutting off the communication between the inside of the fuel tank and the canister.

BACKGROUND

Figure 8:
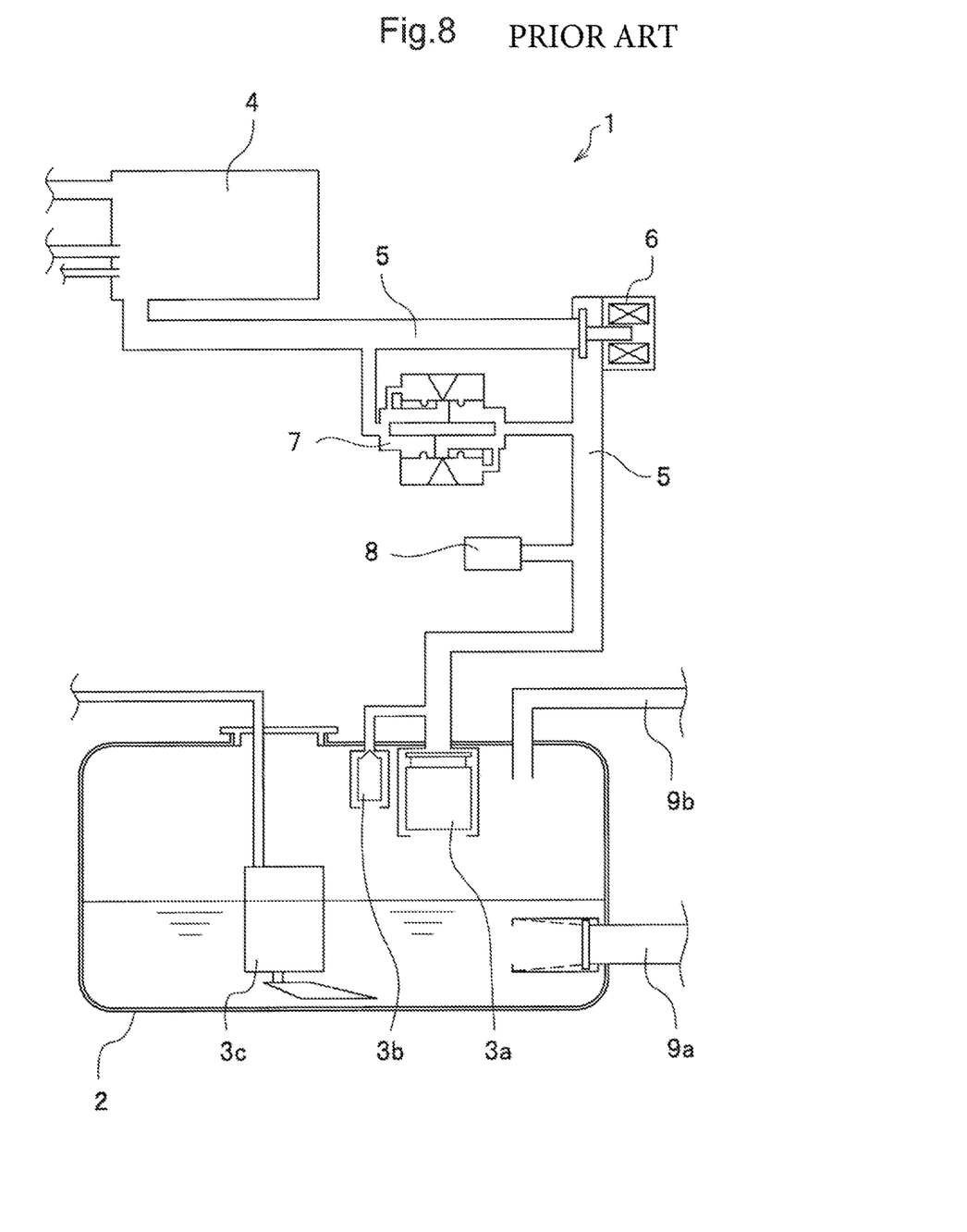
FIG. 8 is a schematic block diagram of the evaporated fuel processing system invented by the applicant, which is related to the conventional technique.

For example, an evaporated fuel processing system 1 as shown in FIG. 8 is disclosed in Japanese Patent No. 5709573. The evaporated fuel processing system 1 has a float valve 3a and a cut valve 3b disposed on the upper portion of a fuel tank 2, and a control valve 6 and a high pressure two way valve 7 which are disposed on a vapor passage 5 for communicating between the fuel tank 2 and a canister 4.

Moreover, in FIG. 8, a reference numeral 3c shows a pump which sends the fuel inside the fuel tank 2 to an unillustrated internal combustion engine, a reference numeral 8 shows a pressure sensor detecting a pressure (tank internal pressure) inside the fuel tank 2, and reference numerals 9a, 9b show a filler pipe and a breather pipe which are provided between the fuel tank 2 and an unillustrated fuel lid, respectively.

The float valve 3a blocks an opening to the vapor passage 5 when the fuel pooled inside the fuel tank 2 is full, and prevents the fuel from entering the inside of the vapor passage 5. Moreover, the control valve 6 is configured with a normally-closed-typed solenoid valve in which a valve body biased by a biasing means such as a spring is seated on a valve seat. The control valve is in a closed state to shut off the flow of the evaporated fuel to the canister 4 side.

Furthermore, for example, the high pressure two way valve 7 is configured with the combination of a positive pressure valve and a negative pressure valve which are in a diaphragm type. The positive pressure valve opens when the pressure inside the fuel tank 2 reaches to a predetermined pressure, and the high pressured and evaporated fuel inside the fuel tank 2 is fed to the canister 4. The negative pressure valve opens when the pressure inside the fuel tank 2 is below a predetermined pressure. The evaporated fuel pooled in the canister 4 returns to the inside of the fuel tank 2.

SUMMARY

For example, the evaporated fuel processing system 1 which is disclosed in Japanese Patent No. 5709573 needs a plurality of valves including the float valve 3a for detecting the state when the fuel is full in the tank, the control valve 6, the high pressure two way valve 7, and the like, which increases the number of components and the manufacturing cost.

Moreover, the evaporated fuel processing system 1 disclosed in Japanese Patent No. 5709573, is configured with a plurality of valves and the like. Accordingly, the number of components is increased and the assembling process becomes complicated.

Thus, it is preferable to reduce the number of components and the manufacturing cost, and provide a fuel shutoff valve which enables to simplify the assembling process.

One aspect of the present disclosure is characterized in that the fuel shutoff valve is attached to the upper portion of the fuel tank and shuts off the communication between the inside of the fuel tank and the outside thereof by opening and closing the communication passage for communicating between the inside of the fuel tank and the outside thereof. The fuel shutoff valve is configured with a first valve mechanism having a coil disposed on the inner periphery of a cylindrical valve chamber and a movable core, which enables to communicate between the fuel tank and the outside thereof by lowering the level of the movable core, and a second valve mechanism which enables to communicate between the fuel tank and the outside thereof by shifting the level of the valve body which is disposed inside the movable core due to the pressure from the inside of the fuel tank or the outside thereof.

Accordingly, it is possible to omit a conventional float valve, simultaneously, the fuel shutoff valve which is integrally formed with an ordinarily used control valve and the high pressure two way valve can be disposed on the upper portion of the fuel tank, where the float valve was disposed. As a result, it is possible to reduce the number of components and the manufacturing cost, simultaneously, simplify the assembling process. Moreover, it can realize to streamline the layout by omitting the control valve and the high pressure two way valve which were conventionally disposed on the vapor passage outside the fuel tank.

Furthermore, another aspect is characterized in that a communicated space is formed between the movable core and the coil in the first valve mechanism, and a hole portion formed on the movable core is used as the communicated space in the second valve mechanism.

Accordingly, the second valve mechanism which functions as a conventional high pressure two way valve is disposed in the valve chamber of the first valve mechanism. Accordingly, the high pressure two way valve and the valve chamber can be used in common.

Moreover, another aspect is characterized in that the valve body can communicate with the inside or the outside by reacting the respective biasing forces of the two bias members which biasing the valve body.

Accordingly, the movable core which forms the first valve mechanism can house the second valve mechanism which releases the evaporated fuel including the positive pressure or the negative pressure inside the fuel tank.

For example, according to the embodiment, the number of components and the manufacturing cost can be reduced. Simultaneously, the fuel shutoff valve can simplify the assembling process.

BRIEF DESCRIPTION OF THE DRAWINGS

FIG. 3 (a) is a sectional view of the fuel shutoff valve shown in FIG. 2, which is taken along the axial direction thereof. FIG. 3 (b) is a partly enlarged cross sectional and perspective view of B part shown in FIG. 3(a).

FIG. 6 (a) is an operationally explanatory view showing the flow of the evaporated fuel (positive pressure) while parking, FIG. 6 (b) is a partly enlarged cross sectional and perspective view which shows the state that a valve guide is elevated by pressurizing force of the evaporated fuel (positive pressure) and engaged with an engaging portion of a second seal member.

DETAILED DESCRIPTION

Next, the embodiment of the present invention will be explained in detail with reference to the drawings.

Figure 1:
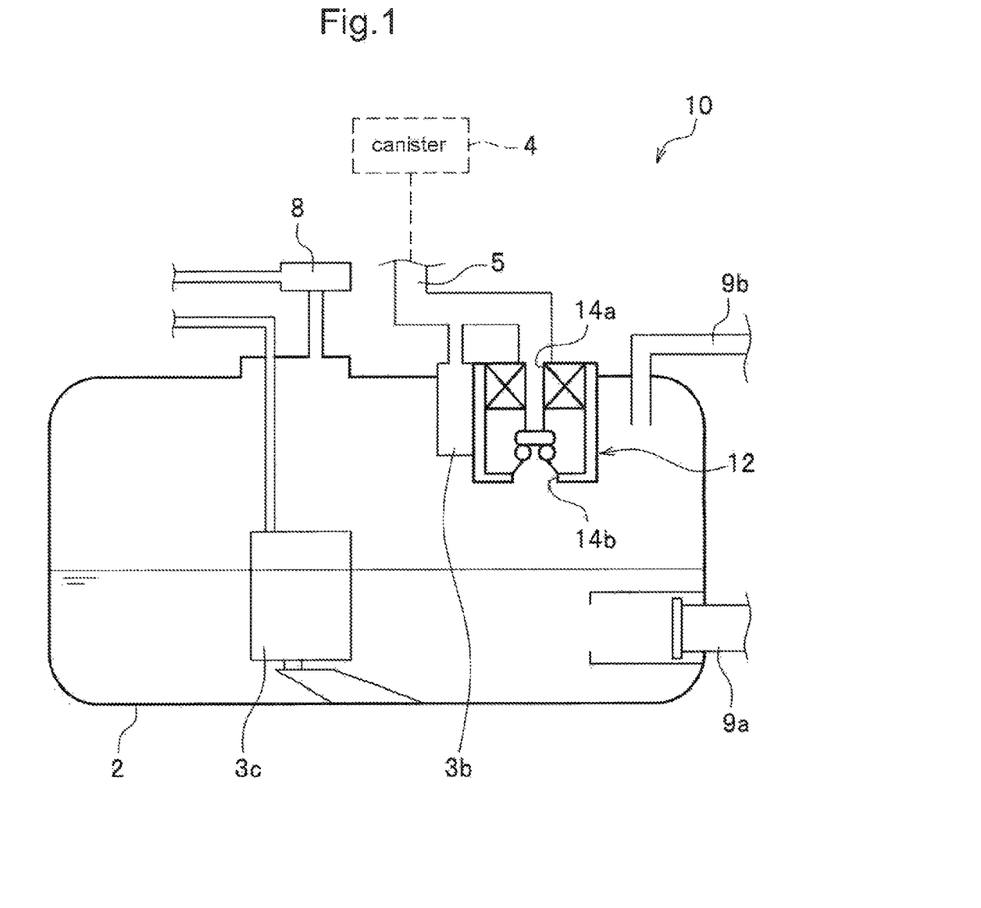
FIG. 1 is a schematic block diagram of the evaporated fuel processing system in which the fuel shutoff valve according to the embodiment of the present invention is installed.
Figure 2:
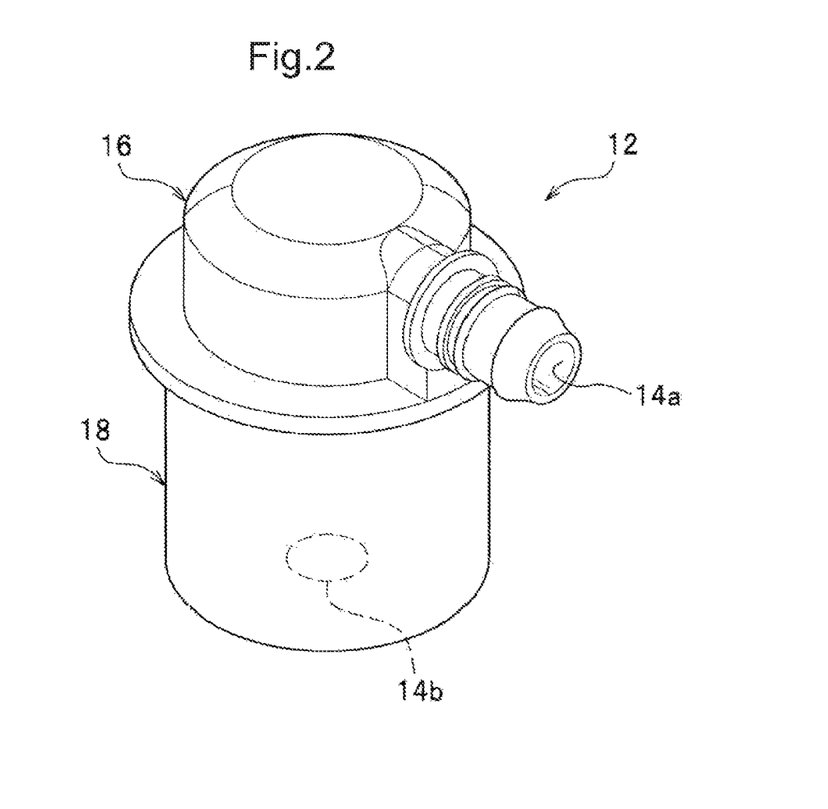
FIG. 2 is a perspective view of the fuel shutoff valve according to the embodiment in the present invention.
Figure 3A:
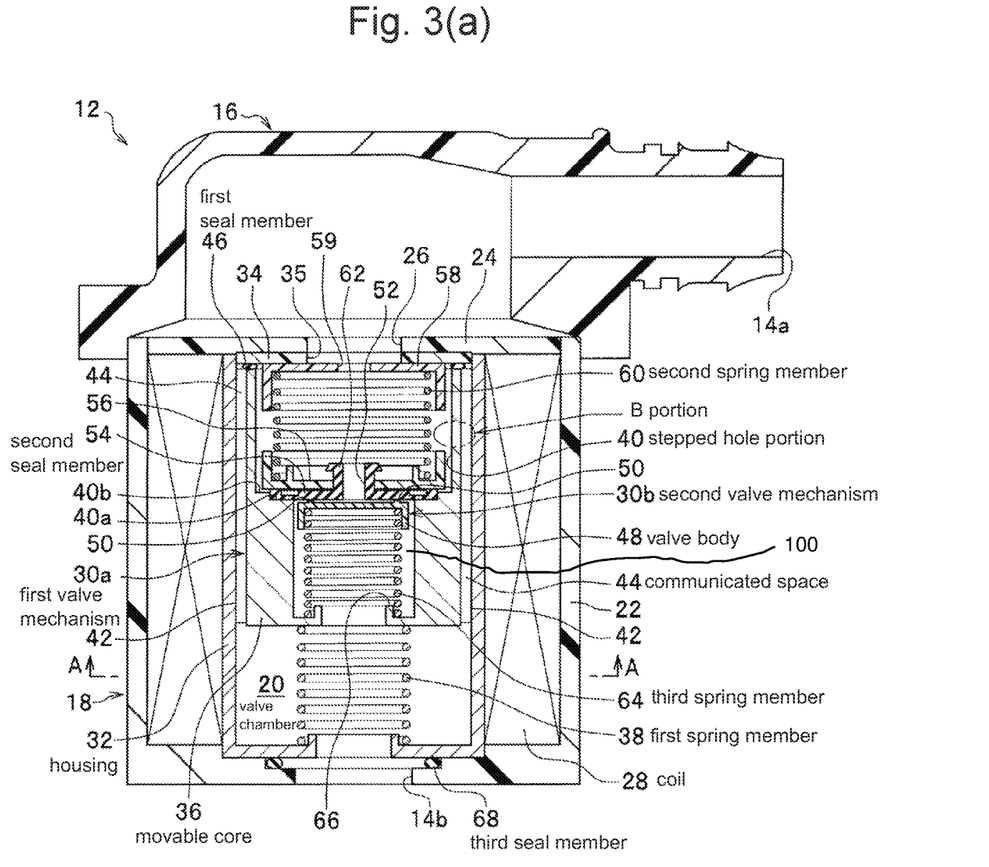
Figure 3B:
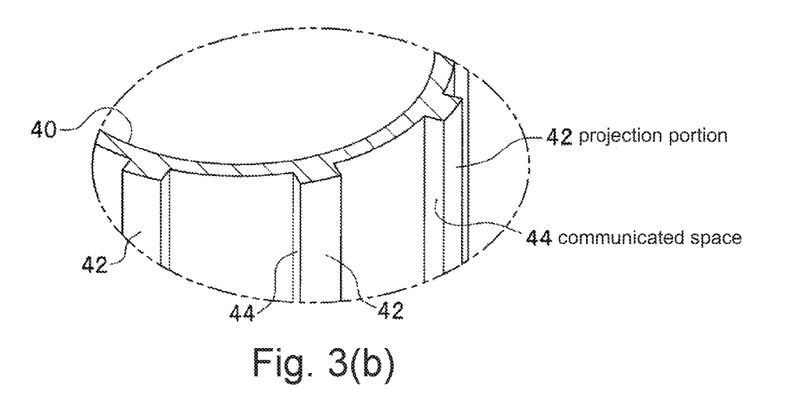
Figure 4:
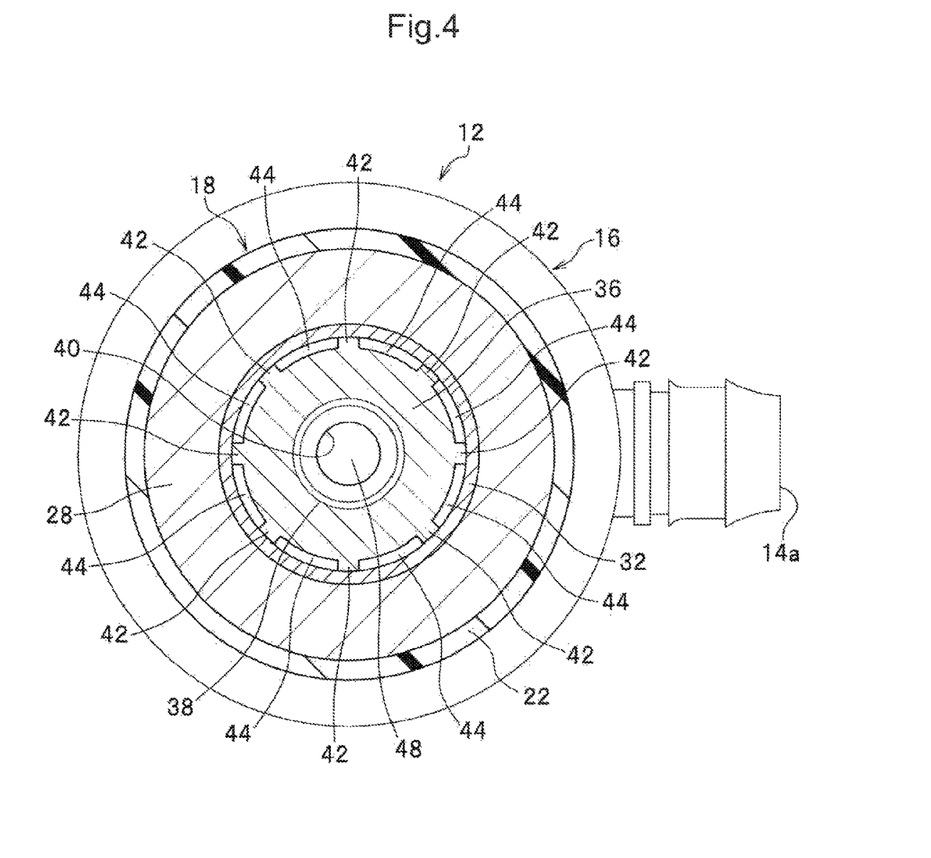
FIG. 4 is a sectional view taken along an A-A line in FIG. 3.

FIG. 1 is the schematic block diagram of the evaporated fuel processing system in which the fuel shutoff valve according to the embodiment of the present invention is installed. FIG. 2 is the perspective view of fuel shutoff valve according to the embodiment in the present invention. FIG. 3 (a) is the sectional view of fuel shutoff valve shown in FIG. 2, which is taken along the axial direction. FIG. 3 (b) is the partly enlarged cross sectional and perspective view of B part shown in FIG. 3(a). FIG. 4 is the sectional view taken along an A-A line in FIG. 3(a).

Moreover, in the evaporated fuel processing system 10 shown in FIG. 1, the same components as the ones of the evaporated fuel processing system 1 shown in FIG. 8 are given the same reference numerals, and the detail explanation will be omitted.

As shown in FIG. 1, the evaporated fuel processing system 10 is attached to the upper portion of the fuel tank 2, and is configured with a fuel shutoff valve 12 shutting off the communication between the inside of the fuel tank 2 and a canister (the outside) 4 by opening and closing the vapor passage (communication passage) 5 which communicates between the fuel tank 2 and the canister 4.

As shown in FIG. 2, the fuel shutoff valve 12 is configured such that a head portion 16 having a first port 14a and a body portion 18 having a second port 14b are integrally combined. The first port 14a is exposed to the outside from the fuel tank 2, and is connected to the vapor passage 5. The second port 14b is formed on the bottom surface of the main body portion 18 so as to face the inside of the fuel tank 2.

As shown in FIG. 3 (a), the main body portion 18 is formed in an approximately bottomed cylindrical shape and configured with a main body cylindrical portion 22 having a valve chamber 20 inside thereof, a disk-shaped lid member 24 blocking an upper opening of the main body cylindrical portion 22. The second port 14b which is configured with a through hole communicated with valve chamber 20 is formed on the lower portion of the main body cylindrical portion 22. A communication hole 26 is formed at the center portion of the lid member 24 so as to communicate between the valve chamber 20 and the first port 14a.

A coil (solenoid coil) 28 in which a conductive wire is cylindrically wound around and laminated is disposed on the inner periphery of the main body cylindrical portion 22. A valve structural body which has both of first valve mechanism 30a and the second valve mechanism 30b is disposed on the inner periphery of the coil 28.

The valve structural body has an approximately cylindrical metal housing 32, a disk-shaped housing cap 34 attached to the upper opening of the housing 32. A communication hole 35 is formed on the housing cap 34 so as to communicate between the first port 14a and the second port 14b. A movable core 36 which can shift the level along the axial direction of the housing 32, and a first spring member 38 which is disposed between the movable core 36 and the bottom portion of the housing 32 and pressurizes the movable core 36 to the upper direction in the housing cap 34 side, are disposed inside the housing 32, respectively.

The movable core 36 is formed with a cylindrical body having a communication space (hole portion, communicated space) 100 which penetrates along the axial direction. A plurality of projection portions (ribs) 42 which project to the radial outer direction and extend along the axial direction of the cylindrical body are formed on the outer periphery surface of the movable core 36. A communicated space 44 is formed between the adjacent projection portions 42 and the inner periphery surface of the housing 32 so as to penetrate along the axial direction of the movable core 36. The plurality of communicated spaces 44 are disposed so as to be separated at a predetermined angle along the peripheral direction in the view from the axial direction of the movable core 36. A stepped hole portion 40 has an annular first step portion 40a and second step portion 40b. The first step portion 40a is provided such that a below-mentioned second seal member 54 is seated. The second step portion 40b is provided with a clearance between thereof and a valve guide 56 positioned on the upper side of the second seal member 54.

A ring-shaped first seal member 46 is firmly fixed on the upper end of the movable core 36 which is adjacent to the housing cap 34. The first seal member 46 integrally shifts the level with the movable core 36, and simultaneously is provided so as to abut on the lower surface of the housing cap 34 and exert the seal function. The first valve mechanism 30a is configured with the housing 32, the coil 28, the first spring member 38, the first seal member 46, and the movable core 36.

A valve body 48 is provided inside the communication space 100 of the movable core 36. An annular projection portion 50 projecting upward is formed on the upper surface of the valve body 48. The second seal member 54 is provided above the valve body 48 so as to have a communication hole 52 penetrating the center thereof and function as a valve seat member. An annular projection portion 50 of the valve body 48 is seated on the lower surface of the second seal member 54 in a valve closing state, and simultaneously, is separated from the lower surface of the second seal member 54 in a valve opening state. FIG.3 (a) shows a state that the annular projection portion 50 of the valve body 48 is seated on the lower surface of the second seal member 54, and a state that the inside of the fuel tank 2 is sealed.

The valve guide 56 and a core cap 58 are oppositely disposed above the second seal member 54 so as to be separated from each other with a predetermined interval. A second spring member (bias member) 60 is interposed between the core cap 58 in the upper side and the valve guide 56 in the lower side. Annular flange portions are provided on the valve guide 56 and the core cap 58 respectively so as to project and face each other. Providing the annular flange portion simplifies a spring bearing of the second spring member 60. A communication hole 59 is formed on the center portion of the core cap 58 so as to communicate between the first port 14a and the second port 14b. An approximately cylindrical engaging portion 62 is provided on the second seal member 54 so as to project upward and engage with an engaging hole of the valve guide 56.

A third spring member (bias member) 64 is disposed under the valve body 48. As for the third spring member 64, the upper end thereof is engaged with the valve body 48, and simultaneously, the lower end thereof is engaged with an inner peripheral engaging portion 66 provided on the lower surface of the movable core 36.

The first spring member 38, the second spring member 60, and the third spring member 64 comprise a respective coil spring. The first spring member 38, the third spring member 64, and the second spring member 60 are disposed in sequence from the lower direction to the upper direction of the movable core 36. A spring force of the first spring member 38, a spring force of the second spring member 60, and a spring force of the third spring member 64 are set in sequence from high to low as below. The relation among the spring force F1 of the first spring member 38, the spring force F2 of second spring member 60, and the spring force F3 of third spring member 64 is set as F1>F2>F3.

The valve body 48 is formed in a valve closing type such that the valve body 48 is seated on the second seal member 54 when the vehicle travelling state as shown in FIG. 3 (a), depending on a balance between the spring force (biasing force) F2 of the second spring member 60 which is disposed above and the spring force (biasing force) F3 of the third spring member 64 disposed below through the second seal member 54 and the valve guide 56. Namely, as explained below in detail, the first valve mechanism 30a and the second valve mechanism 30b are in the valve closing state as shown in FIG. 3 (a), respectively, when the vehicle is travelling.

The second valve mechanism 30b is configured with the valve body 48, the second seal member 54, the communication hole 52, the valve guide 56, the second spring member 60, and the third spring member 64, which are disposed inside the communication space 100 of the movable core 36, respectively.

A third seal member 68 is disposed between the bottom surface of the housing 32 which forms a valve structural body and the bottom surface of the main body portion 18.

The evaporated fuel processing system 10 in which the fuel shutoff valve 12 related to the present embodiment is installed is basically configured as explained above. Next, the operation will be explained.

As shown in FIG. 3 (a), when the vehicle is travelling, the spring force (pressurizing force) of the first spring member 38 pressurizes the movable core 36 upward. Accordingly, the first seal member 46 provided on the upper end of the movable core 36 abuts on the lower surface of the housing cap 34 and seals the first valve mechanism. Namely, when the vehicle is travelling, both of first valve mechanism 30a and second valve mechanism 30b are in the valve closing state, respectively. As a result, the inside of the fuel tank 2 is constantly kept in a sealed state, which enables to prevent the fuel inside the fuel tank 2 from leaking, and prevent the evaporated fuel inside the fuel tank 2 from flowing to the canister 4 side through the vapor passage 5.

Figure 5:
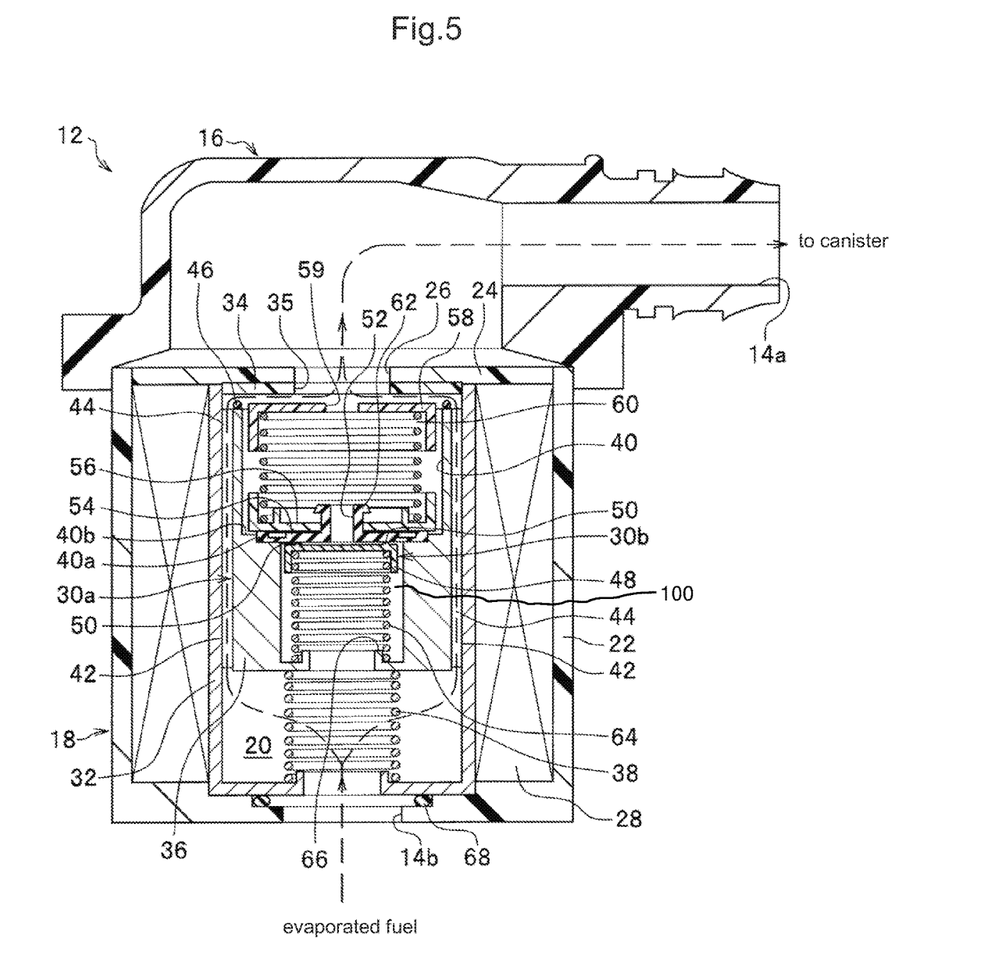
FIG. 5 is an operationally explanatory view showing the flow of the evaporated fuel during refueling.
Figure 6A:
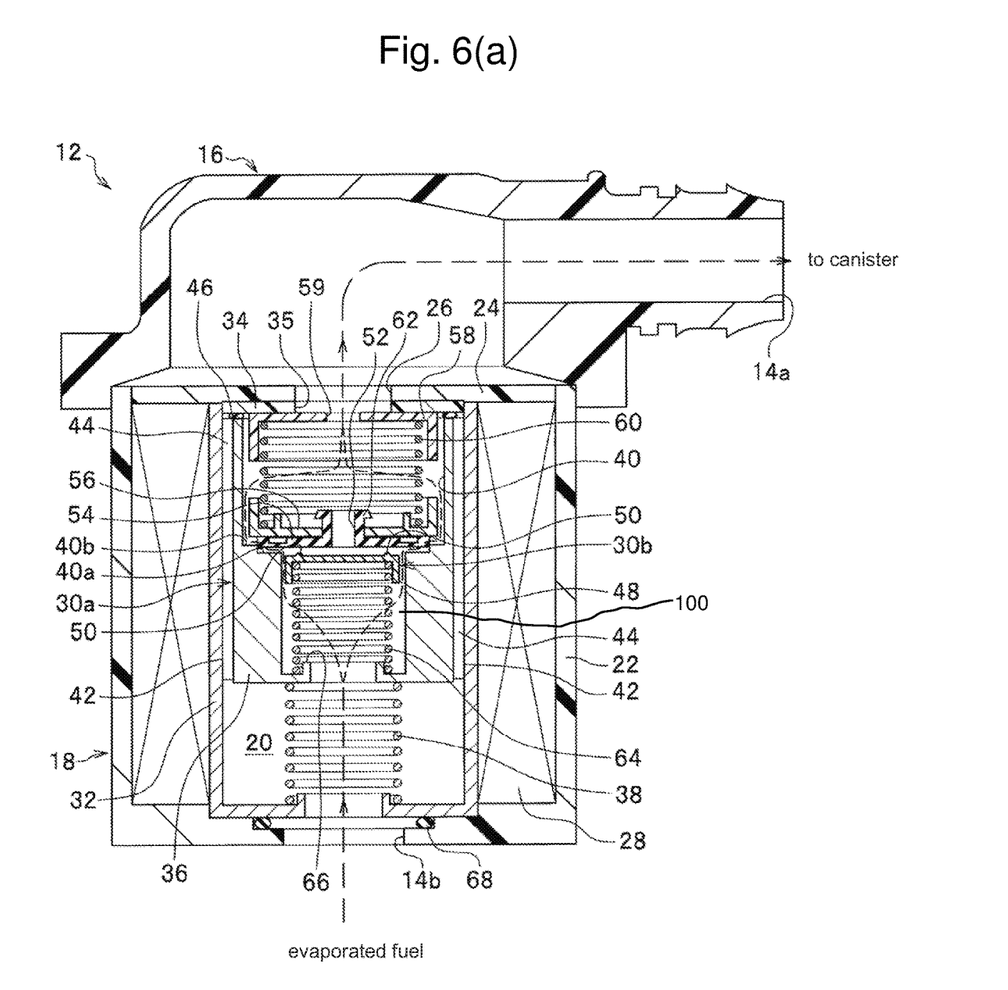
Figure 6B:
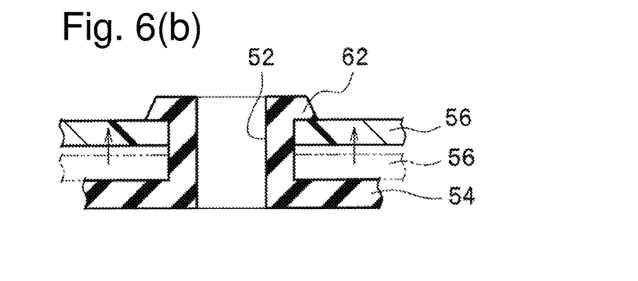
Figure 7:
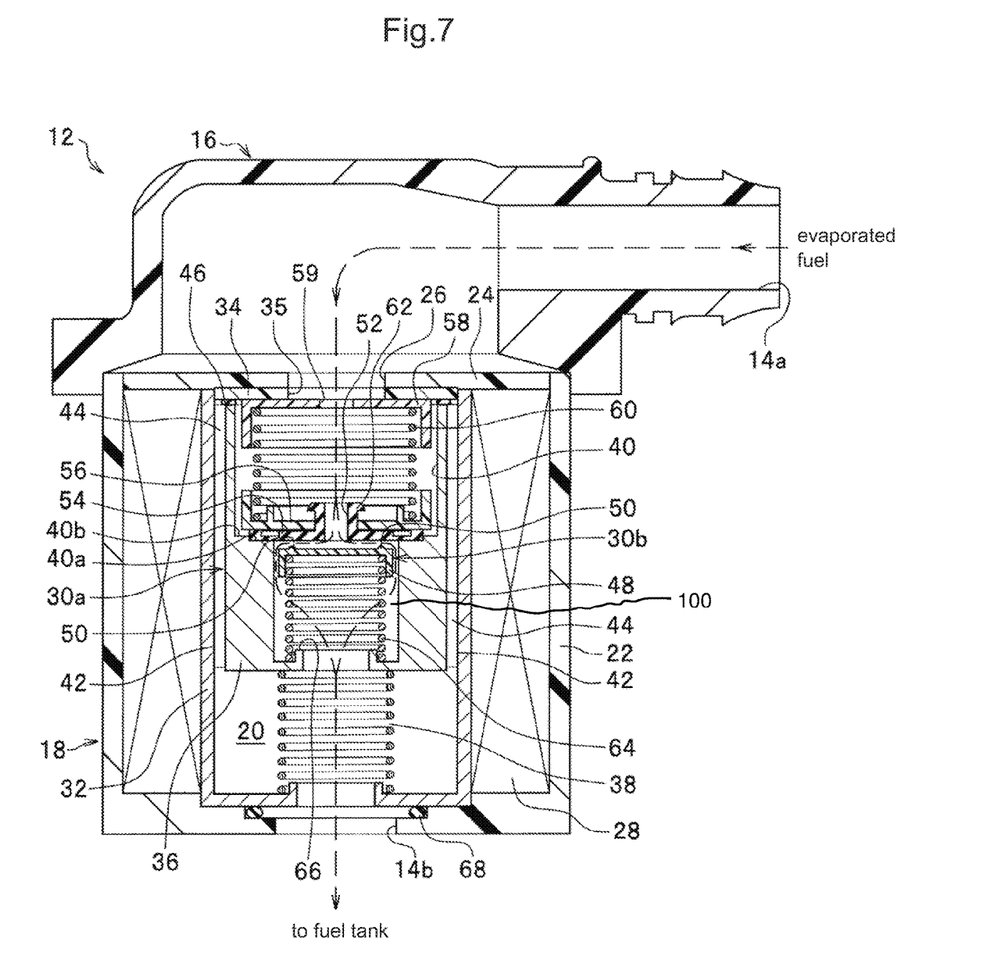
FIG. 7 is an operationally explanatory view showing the flow of the evaporated fuel (negative pressure) while parking.

FIG. 5 is the operationally explanatory view showing the flow of the evaporated fuel during refueling. FIG. 6 (a) and FIG. 7 are the operationally explanatory views showing the flow of the evaporated fuel (positive pressure) while parking, respectively. FIG. 6 (b) is the partly enlarged cross sectional and perspective view which shows the state that the valve guide 56 is elevated by pressurizing force of the evaporated fuel (positive pressure) and engaged with the engaging portion 62 of the second seal member 54.

Next, the fuel tank 2 during refueling will be explained.

An unillustrated control portion energizes the coil 28 during refueling to the fuel tank 2, for example, triggered by opening a fuel cap. As shown in FIG. 5, due to the excitating function of the energized coil 28, the movable core 36 is sucked to the second port 14b side, the movable core 36 lowers the level. Accordingly, the first seal member 46 is separated from the lower surface of the housing cap 34, and the first valve mechanism 30a is in the valve opening state. At the time, the valve body 48 of the second valve mechanism 30b integrally shifts the level with the movable core 36 so as to be kept in the valve closing state that the valve body is constantly seated on the lower surface of the second seal member 54 in the valve closing state. As a result, the evaporated fuel inside the fuel tank 2 is fed to the canister 4 through the second port 14b→the communication space 44→the communication hole 35→the communication hole 26→the first port 14a, and the vapor passage 5, as shown by the dashed arrow in FIG. 5.

For example, an unillustrated control portion stops energizing the coil 28 when an unillustrated liquid level detecting means detects that the fuel tank 2 is full. Accordingly, the spring force of the first spring member 38 restores the movable core 36 to the initial state as shown in FIG. 3 (a), and the first valve mechanism 30a is in the valve closing state. As mentioned above, due to the fact that the movable core 36 can shift the level by stopping energizing the coil 28, the inside of the fuel tank 2 can keep the sealed state, in the present embodiment. As a result, it is possible to omit the float valve 3a (see FIG. 8) like a conventional technique, and to keep the fuel tank 2 sealed by stopping energizing the coil 28 at arbitrary timing, in the present embodiment. Moreover, the unillustrated liquid level detecting means may be an electric device or a mechanical device.

Next, the pressure releasing of the evaporated fuel including the positive pressure and the negative pressure while parking will be explained.

While parking (when the ignition switch is turned off), if a pressure sensor 8 detects the pressure of the evaporated fuel inside the fuel tank 2 exceeding the predetermined pressure (positive pressure), the evaporated fuel pressurizes the second seal member 54 against the spring force of the second spring member 60 and enters the clearance between the second step portion 40b and the valve guide 56, and pressurizes the valve guide 56 upward. Due to the fact that the valve guide 56 lifts the level and is engaged with the engaging portion 62 of the second seal member 54 (see FIG. 6 (b)), the second seal member 54 and the valve guide 56 are integrally lifted.

Accordingly, the second seal member 54 is separated from the annular projection portion 50 of the valve body 48. The second valve mechanism 30b is in the valve opening state (see FIG. 6 (a)). At the time, the first valve mechanism 30a is kept in the valve closing state that the first seal member 46 abuts on the lower surface of the housing cap 34. As a result, the evaporated fuel (positive pressure) which exceeds a predetermined pressure inside the fuel tank 2 is fed to the canister 4, through the second port 14b→the clearance between the second step portion 40b and the valve guide 56→the stepped hole portion 40 in the upper side→the communication hole 59→the communication hole 35→the communication hole 26→the first port 14a, and the vapor passage 5, as shown by the dashed arrow in FIG. 6 (a).

On the contrary to what mentioned above, while parking (when the ignition switch is turned off), if the evaporated fuel inside the fuel tank 2 is below the predetermined pressure (negative pressure), the evaporated fuel inside the fuel tank 2 sucks the valve body 48 to the lower direction against the spring force of the third spring member 64. Accordingly, the valve body 48 is separated from the lower surface of the second seal member 54. The second valve mechanism 30b is in the valve opening state (see FIG. 7). At the time, the first valve mechanism 30a is kept in the valve closing state due to the fact that the first seal member 46 abuts on the lower surface of the housing cap 34. As a result, the evaporated fuel pooled in the canister 4 returned to the inside of the fuel tank 2 through the first port 14a→the communication hole 26→the communication hole 35→the communication hole 59→the communication hole 52→the stepped hole portion 40,→and the second port 14b, as shown in the dashed arrow in FIG. 7. Moreover, when the negative pressure function sucks the valve body 48 to the lower direction, the second seal member 54 is seated on the first step portion 40a and limited as to its movement to the lower level.

As mentioned above, the fuel shutoff valve 12 related to the present embodiment, also has a function of the conventional high pressure two way valve 7 which is configured by the combination of the positive pressure valve and the negative pressure valve.

In the present embodiment, the conventional float valve 3a (see FIG. 8) which were conventionally used can be omitted. Simultaneously, the fuel shutoff valve 12 which is integrally formed with the control valve 6 and the high pressure two way valve 7 (see FIG. 8) can be disposed on the upper portion of the fuel tank 2 where the float valve 3a was disposed. As a result, it is possible to reduce the number of the components and the manufacturing cost, and simultaneously, simplify the assembling process in the present embodiment. Moreover, it is possible to achieve the space efficiency by omitting the control valve 6 and the high pressure two way valve 7 which are conventionally disposed on the vapor passage 5 outside the fuel tank 2.

Moreover, in the present embodiment, the second valve mechanism 30b which functions as a conventional high pressure two way valve 7 is disposed in the valve chamber 20 of the first valve mechanism 30a, and also inside the stepped hole portion 40 of the movable core 36. Accordingly, the high pressure two way valve 7 and the valve chamber 20 can be used in common.

Furthermore, in the present embodiment, it is possible to communicate with the inside or the outside by reacting the spring force of the second spring member 60 (at the time of positive pressure) which pressurizes the valve body 48 of the second valve mechanism 30b or the spring force of the third spring member 64 (at the time of negative pressure), respectively. Accordingly, in the present embodiment, the movable core 36 forming the first valve mechanism 30a can house the second valve mechanism 30b which releases the evaporated fuel including the positive pressure and the negative pressure inside the fuel tank 2. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

We claim:

1. A fuel shutoff valve attached to an upper portion of a fuel tank and shutting off communication between the fuel tank and an outside of the fuel tank by opening and closing a communication passage for communicating between an inside of the fuel tank and the outside of the fuel tank, the fuel shutoff valve comprising:
   a first valve mechanism including a cylindrical valve chamber, a coil disposed to surround the cylindrical valve chamber, and a movable core, the first valve mechanism enabling the communication between the fuel tank and the outside of the fuel tank by moving the movable core lower; and
   a second valve mechanism including a valve body disposed inside the movable core, the second valve mechanism enabling the communication between the fuel tank and the outside of the fuel tank by shifting a level of the valve body due to pressure from the inside of the fuel tank or the outside of the fuel tank,
   wherein the second valve mechanism includes two bias members, each of the members having a biasing force, biasing the valve body, and the second valve mechanism enables the communication with the pressures from the inside of the fuel tank and the outside of the fuel tank, the pressure from the inside of the fuel tank opposing one of the biasing forces of the two bias members and the pressure from the outside of the fuel tank opposing the other one of the biasing forces of the two bias members.

2. The fuel shutoff valve of claim 1,
   wherein the first valve mechanism includes a first communication space between the movable core and the coil, and
   the second valve mechanism includes a second communication space, the second communication space being a hole portion disposed inside the movable core.

3. The fuel shutoff valve of claim 2, wherein the hole portion is a part of the second communication space penetrating the movable core.

4. The fuel shutoff valve of claim 1, wherein the coil moves the movable core.

5. The fuel shutoff valve of claim 1, wherein the first valve mechanism includes a first bias member biasing the movable core, and
   the first bias member has a first biasing force greater than the respective biasing forces of the two bias members of the second valve mechanism.

6. A vehicle comprising the fuel shutoff valve of claim 1.

7. The fuel shutoff valve of claim 1, wherein the second valve mechanism enables the communication between the fuel tank and the outside of the fuel tank through inside the movable core with the pressures from the inside of the fuel tank and the outside of the fuel tank.

8. The fuel shutoff valve of claim 7, wherein the two bias members bias the valve body in directions opposite to each other.

9. A fuel shutoff valve attached to an upper portion of a fuel tank and shutting off communication between the fuel tank and an outside of the fuel tank by opening and closing a communication passage for communicating between an inside of the fuel tank and the outside of the fuel tank, the fuel shutoff valve comprising:
   a first valve mechanism including a cylindrical valve chamber, a coil disposed to surround the cylindrical valve chamber, and a movable core, the first valve mechanism enabling the communication between the fuel tank and the outside of the fuel tank by moving the movable core along an axial direction of the cylindrical valve chamber; and
   a second valve mechanism including a valve body disposed inside the movable core, the second valve mechanism enabling the communication between the fuel tank and the outside of the fuel tank by shifting a level of the valve body due to pressure from the inside of the fuel tank or the outside of the fuel tank,
   wherein the second valve mechanism includes two bias members, each of the members having a biasing force, biasing the valve body, and the second valve mechanism enables the communication with the pressures from the inside of the fuel tank and the outside of the fuel tank, the pressure from the inside of the fuel tank opposing one of the biasing forces of the two bias members and the pressure from the outside of the fuel tank opposing the other one of the biasing forces of the two bias members.

10. The fuel shutoff valve of claim 9, wherein the valve body is configured to move along the axial direction of the cylindrical valve chamber.

11. The fuel shutoff valve of claim 9, wherein the second valve mechanism enables the communication between the fuel tank and the outside of the fuel tank through inside the movable core with the pressures from the inside of the fuel tank and the outside of the fuel tank.

12. The fuel shutoff valve of claim 11, wherein the two bias members bias the valve body in directions opposite to each other.

* * * * *